US011170431B2

(12) United States Patent
Gaur et al.

(10) Patent No.: US 11,170,431 B2
(45) Date of Patent: Nov. 9, 2021

(54) SYSTEMS AND METHODS OF VEHICLE PRODUCT OR SERVICE RECOMMENDATION

(71) Applicant: Cox Automotive, Inc., Atlanta, GA (US)

(72) Inventors: Vishal Gaur, North Hills, NY (US); Mazen Letayf, North Hills, NY (US)

(73) Assignee: Cox Automotive, Inc., Atlanta, GA (US)

( * ) Notice: Subject to any disclaimer, the term of this patent is extended or adjusted under 35 U.S.C. 154(b) by 0 days.

(21) Appl. No.: 16/752,059

(22) Filed: Jan. 24, 2020

(65) Prior Publication Data
US 2021/0233144 A1 Jul. 29, 2021

(51) Int. Cl.
*G06Q 30/00* (2012.01)
*G06Q 30/06* (2012.01)
*G06N 20/00* (2019.01)
*G06Q 40/02* (2012.01)
*G06Q 10/10* (2012.01)
*G06N 5/04* (2006.01)

(52) U.S. Cl.
CPC ........... *G06Q 30/0631* (2013.01); *G06N 5/04* (2013.01); *G06N 20/00* (2019.01); *G06Q 10/10* (2013.01); *G06Q 30/0641* (2013.01); *G06Q 40/025* (2013.01)

(58) Field of Classification Search
None
See application file for complete search history.

(56) References Cited

U.S. PATENT DOCUMENTS

| | | | |
|---|---|---|---|
| 9,747,611 B2 | 8/2017 | Battista | |
| 10,891,628 B1* | 1/2021 | Flowers | G06Q 30/0226 |
| 2002/0049701 A1* | 4/2002 | Nabe | G06Q 30/02 |
| 2004/0205019 A1* | 10/2004 | Painter | G06Q 40/02 705/38 |
| 2005/0278249 A1* | 12/2005 | Jones | G06Q 40/025 705/38 |
| 2008/0154791 A1* | 6/2008 | Bannister | G06Q 40/025 705/36 R |
| 2008/0183616 A1* | 7/2008 | Hankey | G06Q 40/00 705/38 |
| 2015/0081520 A1* | 3/2015 | Brereton | G06Q 30/0201 705/38 |

* cited by examiner

*Primary Examiner* — Mila Airapetian
(74) *Attorney, Agent, or Firm* — Eversheds Sutherland (US) LLP

(57) ABSTRACT

This disclosure describes systems, methods, and devices related to predictive modeling for evaluating vehicles. A device may receive a customer identifier (e.g., a user identification number, a social security number, driver license number, etc.). The device may retrieve credit data associated with the user identifier and vehicle data associated with a vehicle. The device may determine a first weight for the credit data and a second weight for the vehicle data. The device may determine, based on the first weight and the second weight, a value. The device may determine whether or not the value exceeds a profitability threshold. The device may determine a loan information associated with the customer identifier. The device may send a first indication of the product or service to a user device for presentation. The device may send a second indication of the loan information to the second device for presentation.

20 Claims, 7 Drawing Sheets

SYSTEMS AND METHODS OF VEHICLE PRODUCT OR SERVICE RECOMMENDATION

TECHNICAL FIELD

This disclosure generally relates to systems and methods for vehicle product or service recommendation and, more particularly, to using machine-learned models to evaluate and recommend vehicle products or services.

BACKGROUND

Vehicle markets may be substantial. Finance and insurance (F&I) departments offering vehicle products or services contribute significantly to dealership profitability when properly managed and are a primary source of financial liquidity. As a result, many vehicle dealerships consider vehicle product or services sales important for maintaining the ability to conduct vehicle sales transactions.

BRIEF DESCRIPTION OF THE DRAWINGS

The detailed description is set forth with reference to the accompanying drawings, which are not necessarily drawn to scale. In the figures, the left-most digit(s) of a reference number identifies the figure in which the reference number first appears. The same reference numbers in different figures indicate similar or identical items.

DETAILED DESCRIPTION

Figure 1:
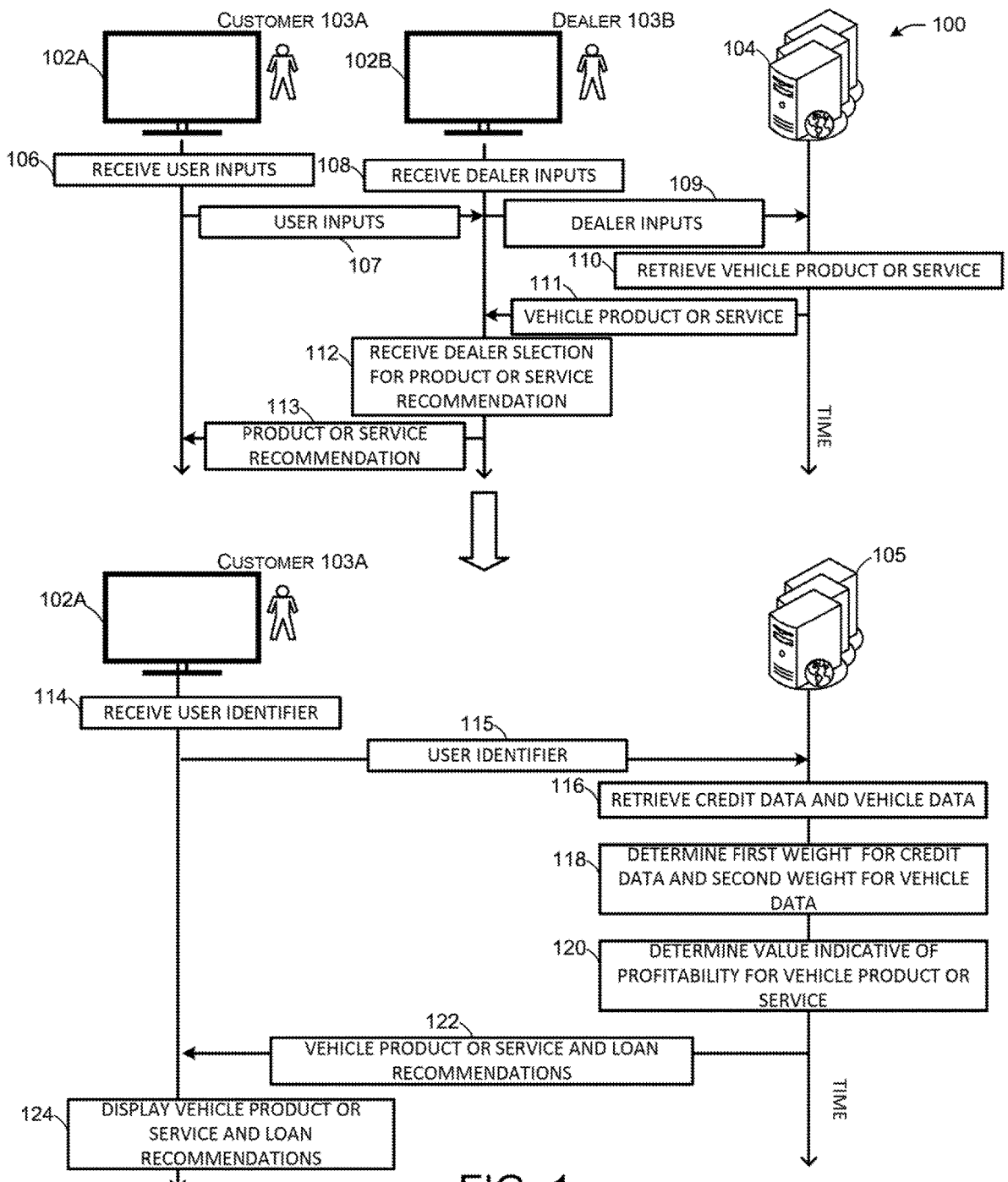
FIG. 1 illustrates an example process for vehicle product or service recommendation, in accordance with one or more example embodiments of the present disclosure.

Illustrative embodiments will now be described more fully hereinafter with reference to the accompanying drawings, in which some, but not all embodiments are shown. The disclosure may be embodied in many different forms and should not be construed as limited to the embodiments set forth herein; rather, these embodiments are provided so that this disclosure will satisfy applicable legal requirements. Like numbers refer to like elements throughout.

In vehicle sales, wholesale costs may rise and retail prices may drop relative to the wholesale costs of vehicles, resulting in profit margin depression. Vehicle dealers may increase profitability by selling vehicle products or services to customers, such as warranties, maintenance plans, vehicle protection plans, and the like. However, by offering such products or services, vehicle sellers may risk losing the potential sale of a vehicle to a customer who may be unlikely to purchase the recommended products or services in addition to buying or leasing a vehicle. For example, the customers may not be interested in the provided vehicle products or services, or may not be willing to spend more than a certain amount of money to purchase the products.

In addition, all decisions associated with vehicle product or service recommendations may be made by dealers (e.g., financial and insurance managers, sale managers, etc.), which may be affected by natural human bias. For example, the dealers may recommend some vehicle products or services that customers may be less likely to purchase, due to a lack of knowledge of a customer's habits or finance. Dealers may find correlation between user characteristics and likelihood of purchasing a product, but may not be able to identify accurately causal relationships between user characteristics and vehicle purchases, and therefore may not consider the most likely factors which may cause a person to purchase a financial and insurance (F&I) product or service, such as the location of the consumer, the time of year, the weather, the person's income or credit, and the like.

Further, some vehicle product or service recommendations to customers may require significant time (and personnel) from the dealers, which makes the product or service sales time-consuming and inefficient. For example, the dealers may spend more than one hour evaluating products or services and customers' finance in a particular transaction. If any errors occur, the processing time may be extended. The customers may complete redundant documents in paperwork or online. Moreover, the customers may be required to provide many personal documents (e.g., driver's license, proof of insurance, form of payment, recent pay stubs, credit score and history, etc.) to complete the documents.

Illustrative embodiments of the enhanced systems and methods described herein may generally be directed to, among other things, to automating and enhancing a computer-based decision making process traditionally performed by dealers (e.g., F&I managers or sale managers) to account for limited user input, likelihood of user purchasing a vehicle product or service, and datasets that drive efficiency and profitability. For instance, given a limited user input (e.g., a user identifier), a computer system may predict a likelihood of user purchasing a product or service based on various datasets, and the computer system may recommend a product or service that will be most likely result in a user purchase. The computer system may also determine one or more effective datasets that drive efficiency and profitability based on a correlation between the datasets and the recommended product or service. As such, without dealers recommending products or services, given a user identifier, a computer system may automatically and efficiently recommend products and/or services that will be most likely result in a purchase, thereby improving a computer's ability to recommend products and services that a consumer is most likely to purchase, removing human bias, efficiently increasing dealer profit, and improving overall customer experience.

Example embodiments of the present disclosure relate to systems and methods for using machine-learned models to evaluate and recommend vehicle products or services. More particularly, a computer system may receive a user/customer identifier (e.g., a user identification number, a social security number, driver license number, etc.). The computer system may retrieve credit data associated with the user/customer identifier and vehicle data associated with a vehicle. The computer system may determine a first weight for the credit data and a second weight for the vehicle data. The computer system may determine, based on the first weight and the second weight, the value. The computer system may determine whether or not the value exceeds a profitability threshold. The computer system may send a first indication of the product or service to a user device for presentation. Additionally and/or alternatively, the computer system may determine vehicle loan information associated with the user identifier. The computer system may send a second indication of the loan information to the user device for presentation (e.g., concurrent presentation of the loan information along with recommended products and/or services). The loan information may include a vehicle price, loan terms, interest rates, lenders, payment terms, one or more credit limits, a loan to value ratio, and the like.

In some embodiments, the computer system may provide instant deal structuring as the user changes the credit data and/or vehicle data. For instance, the computer system may allow the user to adjust the credit data (e.g., increasing or decreasing a down payment, or the like) and/or vehicle data, such as the make, model, and/or year of a vehicle that the user is considering purchasing. The computer system may provide, at or near real-time, an updated presentation of vehicle loan information and product or service recommendations.

The credit data may describe credit information associated with the user identifier. Credit information may include personal information (e.g., birth date, current and past home addresses, phone numbers, and/or current and past employers, etc.), account information (e.g., credit cards, installment loans, mortgages or auto loans, etc.), public records (e.g., bankruptcies), and/or user characteristics (e.g., behavioral driving habit, a residency, age, gender, etc.). The credit data may include one or more datasets associated with one or more credit information. For example, the credit data may include a first dataset associated with personal information, a second dataset associated with account information, a third dataset associated with user characteristics, and so forth. In some embodiments, the credit data may be also used to provide possible deal for the vehicle.

The vehicle data may describe vehicle information associated with a vehicle. The vehicle information may include one or more features (e.g., a make, a model, a year, a vehicle type, tire type, size, colors, sunroofs, extended cabs, four-wheel drive, number of engine cylinders, etc.), deals, features associated with the deals (e.g., deal type, expiration date, etc.), products or services (e.g., vehicles alone, product or services for vehicle protection, vehicle accessories, extended warranties, insurance, paint protections, etc.), local market information, geological location of dealers selling the vehicle, one or more dealer goals (e.g., increasing back-end gross profit, increasing profitability, etc.), inventory cost, customer incentives, dealer rebates, trade-in valuation, aftermarket products, dealer pay plans, cost of dealer-trade, floor-planning, or aged inventory. The vehicle data may include one or more datasets associated with one or more vehicle information. For example, the vehicle data may include a fifth dataset associated with the features, a sixth dataset associated with deals, a seventh dataset associated with products or services, and so forth.

The first weight and the second weight may be associated with a value indicative of a profitability for a product or service. A weight may indicate a strength of a correlation between data (e.g., credit data or vehicle data) and the value. For instance, a greater weight may indicate that the data has a stronger correlation with the value. A less weight may indicate that the data has a weaker correlation with the value. In some embodiments, a less weight may indicate that the data has a stronger correlation with the value. A greater weight may indicate that the data has a weaker correlation with the value. By adjusting the weights indicative of a strong correlation with the value, the value will be changed greatly. By adjusting the weights indicative of weak correlation with the value, the value will be slightly changed or no significant change.

In some embodiments, a weight may include one or more sub-weights, each sub-weight indicative of a strength of a correlation between a dataset of the credit data or the vehicle data and the value. For instance, a greater sub-weight may indicate that the dataset has a stronger correlation with the value. A less sub-weight may indicate that the dataset has a weaker correlation with the value. In some embodiments, a less sub-weight may indicate that the dataset has a stronger correlation with the value. A greater sub-weight may indicate that the dataset has a weaker correlation with the value. By adjusting the sub-weights indicative of a strong correlation with the value, the value will be changed greatly. By adjusting the sub-weights indicative of weak correlation with the value, the value will be slightly changed or no significant change. As one example, the first weight associated with the credit data may include one or more sub-weights, and each sub-weight is associated with each dataset of the credit data, such as a first sub-weight associated with the first dataset, a second sub-weight associated with the second dataset, a third-sub-weight associated with the third dataset, and so forth. As another example, the second weight associated with the vehicle data may include one or more sub-weights, and each sub-weight is associated with each dataset of the vehicle data, such as a first sub-weight associated with the fifth dataset, a second sub-weight associated with the sixth dataset, a third-sub-weight associated with the seventh dataset, and so forth. In some embodiments, a weight may be a combination of sub-weights. For example, a weight can be a sum of the sub-weights.

The value indicative of a profitability for a product or service may describe a likelihood of the product or service being profitable to account for a likelihood of a user purchasing the product or service, and/or a likelihood of achieving one or more dealer goals (e.g., increasing back-end gross profit, increasing front-end gross profit, etc.). For instance, a product or service that a user is most likely to purchase and is most likely resulting in higher profit may have a greater value than a product or service that the user is most likely to purchase, but slightly increasing the profit, and a product or service that the user is less likely to purchase. For example, a vehicle protection may cost more than a vehicle accessory. The computer system may determine that a user is most likely to purchase a vehicle protection service and a vehicle accessory. The computer system may determine that a first value associated with the vehicle protection and a second value associated with the vehicle accessory. The first value is greater than the second value may indicate that the vehicle protection service may generate more profit than the vehicle accessory, and/or that some data associated with the user (e.g., financial information, driving history, date/time, location, etc.) may indicate that the user is more likely to purchase the vehicle protection plan. For example, when the user lives in an area with significant winter weather or when the user has multiple accidents in a driving history, the user may be more likely to purchase the vehicle protection plan, and the vehicle protection plan may be more profitable to the seller.

The computer system may receive a user/customer identifier (e.g., a user identification number, a social security number, driver license number, etc.). For example, the computer system may provide a graphical user interface (GUI) to a user (e.g., a customer, or a dealer) for inputting a user identifier.

The computer system may retrieve credit data associated with the user/customer identifier and vehicle data associated with a vehicle. For example, the computer system may retrieve the credit data based on the user identifier. The computer system may retrieve the vehicle data based on the credit data. In some embodiments, the credit data and vehicle data may be from one or more databases of the computer system. In some embodiments, the computer system may send a request to a third-party system to retrieve the credit data and/or vehicle data.

The computer system may determine a first weight for the credit data and a second weight for the vehicle data. In some embodiments, the computer system may determine the first weight and the second weight based on a machine-learned model. For instance, the credit data and vehicle data may be an input for the machine-learned model. The machine-learned model may generate respective weights and sub-weights associated with the credit data and vehicle data. In some embodiments, the weights and sub-weights may be generated during training the machine-learned model. For instance, during training, the machine-learned model may assign a sub-weight and/or bias to each dataset. The machine-learned model may adjust each sub-weight in order to optimize a loss function or a cost function such that an error between an output of the machine-learned model and an expected output is reduced.

In some embodiments, the machine-learned model may include one or more supervised machine-learned models, one or more unsupervised machine-learned models, one or more neural networks (e.g., deep neural networks) or any other multi-layer non-linear models. A neural network may include a recurrent neural network (e.g., a long short-term memory recurrent neural network), a feed-forward neural network, or any other form of a neural network.

In some embodiments, the machine-learned model may be included in or otherwise stored and implemented by a user device such as a laptop, tablet, or smartphone. As yet another example, the machine-learned model may be included in or otherwise stored and implemented by a server that communicates with the user device according to a client-server relationship. For example, the machine-learned model may be implemented by the server as a portion of a web service. In some embodiments, the machine-learned model may be received from the server over a network, stored in a memory of the user device, and the used or otherwise implemented by one or more processors of the user device.

The computer system may determine, based on the first weight and the second weight, the value. In some embodiments, the computer system may determine the value using the machine-learned model. The value may be an output of the machine-learned model.

The computer system may determine whether or not the value exceeds a profitability threshold (e.g., via a comparison to a threshold). The profitability threshold may indicate a threshold for determining whether or not the product or service being profitable. If the computer system determines that the value is greater than the profitability threshold, the computer system may send an indication of the product or service to a user device for presentation. For example, the computer system may use one or more graphical user interfaces to display the product or service. In some embodiments, the computer system may use the one or more graphical user interfaces to further display weights, sub-weights, and/or the value to a user (e.g., a dealer) to better understand the datasets that have strong correlations with the value such that the user may make an adjustments to the dataset for later use. For example, the computer system may compare sub-weights with a sub-weight threshold. The sub-weight threshold may describe a threshold for determining whether or not a dataset having strong correlation with the value. If the computer system determines that the sub-weight is greater than a sub-weight threshold, the computer system may send an indication of the sub-weight and the value to a user device for presentation.

In some embodiments, the computer system may determine whether or not sub-weights exceed a sub-weight threshold (e.g., via a comparison to a threshold). The computer system may determine a correlation between datasets associated with the sub-weights and the value based on the determination. For example, the computer system may select one or more sub-weighs that are above the sub-weight threshold. The selected one or more sub-weights indicate that datasets associated the selected one or more sub-weights may have strong correlations with the value.

In some embodiments, the computer system may train the machine-learned model using various training or learning techniques, such as, for example, backwards propagation of errors. In some embodiments, performing backwards propagation of errors may include performing truncated back-propagation through time. The computer system may perform a number of generalization techniques (e.g., weight decays, dropouts, etc.) to improve the generalization capability of the machine-learned model being trained.

In particular, the computer system may train the machine-learned model based on training sets. The training sets may include, for example, the value indicative of the profitability of the product or service, and/or feedback measurement indicative of user purchases associated with the product or service. In some embodiments, the computer system may train the machine-leaned model using the value. As one example, the computer system may determine that the value is greater than the profitability threshold, and determine that the product or service has been purchased by the user. The computer system may determine an adjustment to further refine one or more sub-weights indicative of a strong correlation between datasets associated with the one or more sub-weights and the associated value. The computer system may generate an adjusted machine-learned model based on the adjusted sub-weights. As another example, the computer system may determine that the value is less than the profitability of the product or service. The computer system may further determine that the product or service has been purchased by the user, or vice versa. The computer system may determine an adjustment to one or more sub-weights indicative of a strong correlation between datasets associated with the one or more sub-weights and the associated value. The computer system may generate an adjusted machine-learned model based on the adjusted sub-weights. Additionally or alternatively, the computer system may update sub-weights for all the datasets, and re-select one or more updated sub-weights indicative of strong correlation between datasets associated with the one or more updated sub-weights and an associated value.

In some embodiments, the computer system may train the machine-learned model based on the feedback measurement indicative of user purchases associated with the product or service. As one example, the computer system may receive the feedback measurement indicating that the user has purchased the product or service. The computer system may determine a profit value produced by the product or service. The computer system may determine an adjustment to further refine one or more sub-weights indicative of a strong correlation between datasets associated with the one or more sub-weights and the associated value. The computer system may generate an adjusted value based on the adjusted sub-weights. The adjusted value may be more consistent with the profit value compared with the previous value. As another example, the computer system may update sub-weights for all the datasets, and re-select one or more updated sub-weights indicative of strong correlation between datasets associated with the one or more updated sub-weights and an associated value. The computer system may replace the previous sub-weights indicative of a strong correlation between datasets associated with the sub-weights and the associated value by the adjusted sub-weights. The computer system may determine an adjusted correlation between a dataset associated with the adjusted sub-weights and the adjusted value.

In some embodiments, the computer system may provide multiple vehicle products or services recommendation using the credit data and the vehicle data. The computer system may use the machine-learned model to determine a first value indicative of a profitability for a first product or service (e.g., vehicle protection), and to determine a second value indicative of a profitability for a second product or service (e.g., vehicle accessories). If the first value and the second value are greater than the profitability threshold, the computer system may send an indication of the first product or service and the second product or service to the user device for presentation. Additionally, or alternatively, the computer system may determine that the second value is less than the first value, indicating that the first product or service is more likely to produce higher profit than the second product or service. The computer system may further determine that the first product or service has been purchased by the user based on the credit data, or that the first product or service has been expired or suspended based on the vehicle data. If the first product or service associated with a first vehicle has been purchased by the user, the computer system may provide the same product or service (or a similar product or service) associated a second vehicle for the user. If the first product or service has been expired or suspended, the computer system may remove the first product or service or replace the first product or service by the second product or service (e.g., an updated version of the first product or service, or next available product or service) for presentation. If the first value is less than the profitability threshold and the second value is greater than the profitability threshold, the computer system may remove or replace the first product or service by the second product or service, and send an indication of the second product or service instead of the first product or service to the user device for presentation.

In some embodiments, the computer system may determine different datasets having strong correlations with associated values for different products or services. For instance, the computer system may determine a first group of datasets having strong correlations with the first value, and determine a second group of datasets having strong correlations with the second value. The first group and the second group may be different. In some embodiments, when the computer system uses the same machine-learned model for different products or services, then the computer system may use different sub-weight threshold. For example, the computer system may determine a first set of sub-weights that are greater than a first sub-weight threshold for the first product or service, and a set group of sub-weights that are greater than a second sub-weight threshold for the second product or service. The first sub-weight threshold may be different from the second sub-weight threshold (e.g., the first sub-weight threshold may be greater than the second sub-weight threshold, or vice versa), and the first set and the second set are different (e.g., at least one sub-weight in the first set is not included in the second set, or vice versa). In some embodiments, the computer system may use different machine-learned models for different products or services.

In some embodiments, the computer system may determine loan information associated with the user identifier using the machine-learned model. For instance, the machine-learned model may use the credit data and vehicle data as inputs and the machine-learned model may output the loan information. The computer system may use the graphical user interface (GUI) to display the loan information on the user device. In some embodiments, the computer system may allow the user to adjust the credit data and/or vehicle data via the graphical user (GUI). The loan information outputted by the machine-learned model will be adjusted based on the adjusted credit data and/or vehicle data. In some embodiments, the computer system may use the machine-learned model to determine financial information for the dealer. The computer system may use the graphical user interface (GUI) to display the financial information on a user device used by the dealer.

The present disclosure provides a number of technical effects and benefits. As one example of a technical effect and benefit, the systems and methods of the present disclosure may use a trained machine-learned model to predict a value of a profitability of a product or service to account for a likelihood of a user purchasing the product or service, and/or a likelihood of achieving one or more dealer goals (e.g., increasing back-end gross profit, increasing front-end gross profit, etc.). The computer system may learn which datasets are more relevant to identifying products and services that a consumer is likely to purchase. As such, the computer system may continually improve its ability to identify products based on which datasets are prioritized. In addition, human bias is removed and customer experience is improved. Such systems and methods provides a robust machine-learned model that efficiently improves dealership profitability regardless of complexity of dealer goals.

As another example technical effect and benefit, the computer system may use the robust machine-learned model to automatically and efficiently recommend products or services while limiting user inputs, instead of requiring users to bring many personal documents and to complete redundant documents, and without requiring multiple parties and computers to determine and provide recommendations.

As yet another example technical effect and benefit, the systems and methods of the present disclosure may uses the trained machine-learned model for product or service recommendation, instead of using a "middle man" such as dealers, F&I managers, and sale mangers. As such, processing time may be significantly reduced from more than one hours to several seconds.

FIG. 1 illustrates an example process 100 for vehicle product or service recommendation, in accordance with one or more example embodiments of the present disclosure.

Referring to FIG. 1, devices 102A and 102B may communicate with one or more servers 104. The device 102A may receive user inputs from a customer 103A at step 106. The customer 103A may complete redundant documents on the device 102A, and wait for dealer processing time. Moreover, the customer 103A may be required to bring many personal documents (e.g., driver's license, proof of insurance, form of payment, recent pay stubs, credit score and history, etc.) to complete the information input into the device 102A for a vehicle purchase or lease. At step 107, the device 102A may send the user inputs to the device 102B. The device 102B may, at step 108, receive dealer inputs (e.g., a vehicle make, model, and year, and additional features of a vehicle) from a dealer 103B. At step 109, the device 102B may send the dealer inputs to the one or more servers 104. The one or more servers 104 may, at step 110, retrieve one or more vehicle products or services (e.g., vehicle protection, vehicle accessories, etc.). At step 111, the one or more servers 104 may send the one or more vehicle products or services to the device 102B. The device 102B may display the one or more vehicle products or services to the dealer 103B such that the dealer 103B may review and select a product or service. The device 102B may, at step 112, receive dealer selection for the product or service recommendation. At 113, the device 102B may send the product or service recommendation to the device 102A. Such process may make the product or service sales time-consuming and inefficient, and result in human bias. In addition, the customer 103A may not be interested in or may not be able to afford buying the product or service by selected the dealer 103B. The process may start over.

Still referring to FIG. 1, at step 114, the device 102A may receive a user identifier (e.g., a user identification number, a social security number, driver license number, etc.). At step 115, the device 102A may send the user identifier to one or more servers 105. At step 116, the one or more servers 105 may retrieve credit data associated with the user identifier and vehicle data associated with a vehicle. For example, the one or more servers 105 may retrieve the credit data based on the user identifier. The one or more servers 105 may retrieve the vehicle data based on the credit data. In some embodiments, the credit data and vehicle data may be from one or more databases of the one or more servers 105. In some embodiments, the one or more servers 105 may send a request to a third-party system to retrieve the credit data and/or vehicle data.

At step 118, the one or more servers 105 may determine a first weight for the credit data and a second weight for the vehicle data. In some embodiments, the one or more servers 105 may determine the first weight and the second weight based on a machine-learned model. For instance, the credit data and vehicle data may be an input for the machine-learned model. The machine-learned model may generate respective weights and sub-weights associated with the credit data and vehicle data. In some embodiments, the weights and sub-weights may be generated during training the machine-learned model. For instance, during training, the machine-learned model may assign a sub-weight and/or bias to each dataset. The machine-learned model may adjust each sub-weight in order to optimize a loss function or a cost function such that an error between an output of the machine-learned model and an expected output is reduced. At step 120, the one or more servers 105, based on the first weight and the second weight, a value indicative of profitability for vehicle product or service. For instance, the one or more servers 105 may determine the value using the machine-learned model. The value may be an output of the machine-learned model. At step 122, the one or more servers 105 may determine and send vehicle product or service and loan recommendations to the device 102A. In some embodiments (not shown in FIG. 1), the one or more servers 105 may send the vehicle product or service and loan recommendations to the device 102B. At step 124, the one or more servers 105 may display the vehicle product or service and loan recommendations to the customer 103A. In some embodiments (not shown in FIG. 1), the one or more servers 105 may display the vehicle product or service recommendation to the dealer 103B. The loan recommendations may include the loan information as described above, and the load recommendations may be displayed concurrently with the recommended vehicle products and/or services. In this manner, the customer 103A may be presented a deal with both financial details and recommended products and services for the selected vehicle.

In some embodiments, the one or more servers 105 may use the machine-learned model to predict the value of the profitability of the product or service to account for a likelihood of a user purchasing the product or service, and/or a likelihood of achieving one or more dealer goals (e.g., increasing back-end gross profit, increasing front-end gross profit, etc.). As such, human basis is removed. Such systems and methods provides a robust machine-learned model that efficiently improves dealership profitability regardless of complexity of dealer goals. Moreover, the one or more servers 105 may use the robust machine-learned model to automatically and efficiently recommend product or service while limiting user inputs, instead of requiring users to bring many personal documents and to complete redundant documents. Additionally, the one or more servers 105 may use the machine-learned model for product or service recommendation, instead of using the device 102B. As such, processing time may be significantly reduced from more than one hours to several seconds. In some embodiments, the servers 105 are remote from the device 102A and the device 102B. The servers 105 can access to various information from the device 102A and the device 102B or from other additional servers and devices (not shown in FIG. 1). In some embodiments, the device 102A and the device 102B may be the same device, In some embodiments, the device 102A and the device 102B may be different.

Figure 2:
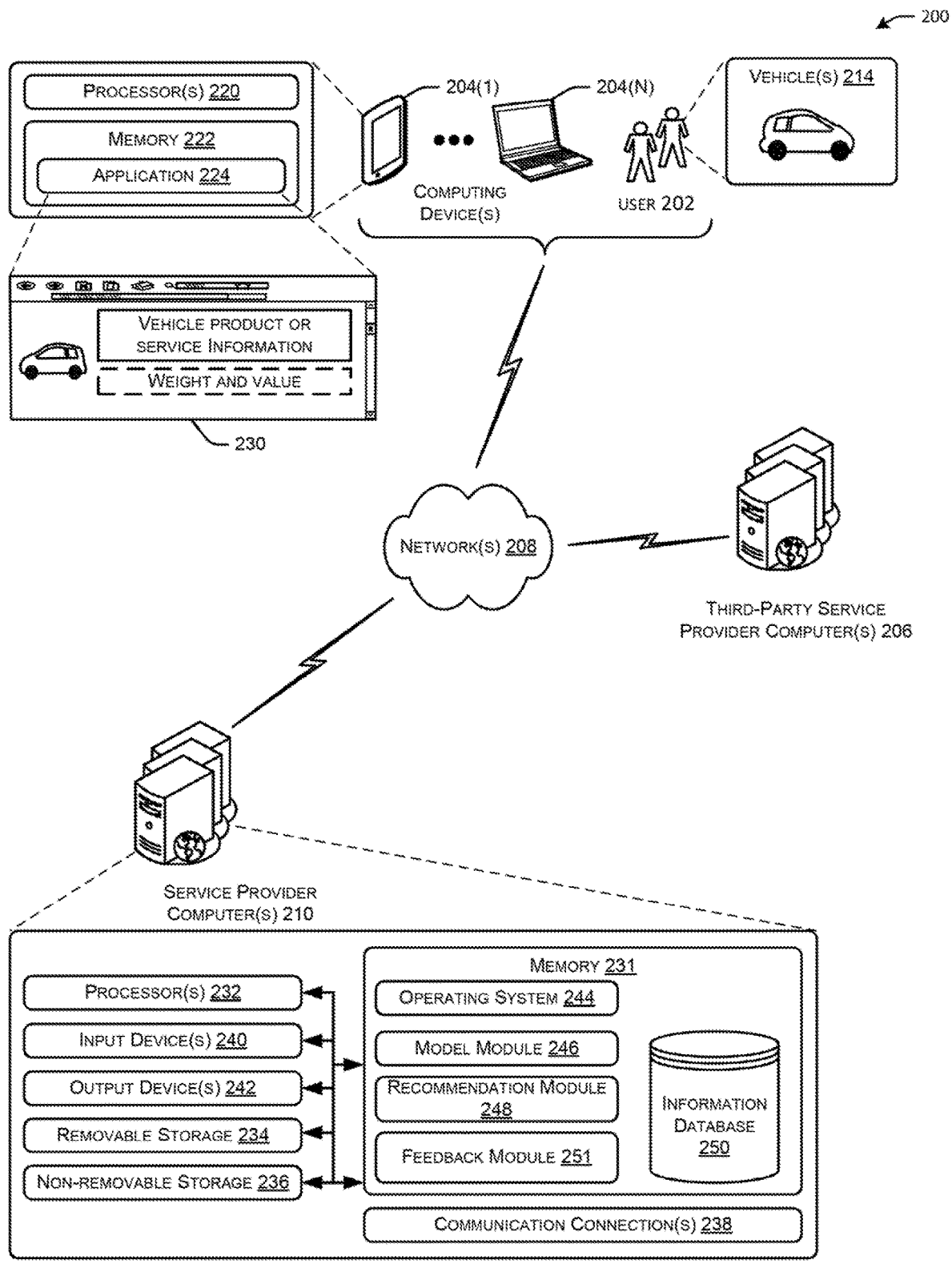
FIG. 2 depicts an illustrative system for vehicle product or service recommendation, in accordance with one or more example embodiments of the present disclosure.

FIG. 2 depicts an illustrative system 200 for vehicle product or service recommendation, in accordance with one or more example embodiments of the present disclosure.

As shown in FIG. 2, the system 200 may include one or more service provider computers 210 (e.g., the one or more servers 105 of FIG. 1), one or more users (e.g., customers, dealers, etc.) 202 associated with one or more computing devices 204(1), . . . , 204(N) (e.g., the device 102 of FIG. 1), and one or more third-party service provider computers 206. In the system 200, the users 202 may utilize the computing devices 204 to access an application interface 230 (or web site) that may be provided by, created by, or otherwise associated with the service provider computers 210 via one or more networks 208. The one or more computing devices 204(1), . . . , 204(N) may call one or more active programming interfaces of the one or more service provider computers 210 using the application interface 230 to provide a user identifier and receive product or service recommendations and/or associated information (e.g., weight and value indicative of a profitability of a product or service). In some instances, the computing devices 204 may be configured to present or otherwise display the application interface 230 to the users 202. While the illustrated example represents the users 202 accessing the application interface 230 over the networks 208, the described techniques may equally apply in instances where the users 202 interact with a service provider via a personal computer, over the phone, via a kiosk, or in any other manner. It is also noted that the described techniques may apply in other client/server arrangements (e.g., set-top boxes, etc.), as well as in non-client/server arrangements (e.g., locally stored software applications, etc.).

In some aspects, the application interface 230 associated with the computing devices 204 may allow the users 202 to access, receive from, transmit to, or otherwise interact with the service provider via the service provider computers 210. In some examples, the application interface 230 may also allow the users 202 to transmit to the service provider computers 210 over the networks 208 information associated with one or more vehicles 214.

The service provider computers 210 may be any type of computing devices, such as, but not limited to, mobile, desktop, and/or cloud computing devices, such as servers. In some examples, the service provider computers 210 may be in communication with the computing devices 204 and the third party service provider computers 206 via the networks 208, or via other network connections. The service provider computers 210 may include one or more servers, perhaps arranged in a cluster, as a server farm, or as individual servers not associated with one another. These servers may be configured to host a website viewable via the application interface 230 associated with the computing devices 204 or any other Web browser accessible by a user 202. In addition, the service provider computers 210 may communicate with one or more applications or other programs running the computing devices 204.

The computing devices 204 may be any type of computing devices including, but not limited to, desktop personal computers (PCs), laptop PCs, mobile phones, smartphones, personal digital assistants (PDAs), tablet PCs, game consoles, set-top boxes, wearable computers, e-readers, web-enabled TVs, cloud-enabled devices and work stations, and the like. In certain aspects, the computing devices 204 may include touch screen capabilities, motion tracking capabilities, cameras, microphones, vision tracking, etc. In some instances, each computing device 204 may be equipped with one or more processors 220 and memory 222 to store applications and data, such as an auction application 224 that may display the client application interface 230 and/or enable access to a website stored on the service provider computers 210, or elsewhere, such as a cloud computing network.

The third-party service provider computers 206 may also be any type of computing devices such as, but not limited to, mobile, desktop, and/or cloud computing devices, such as servers. In some examples, the third-party service provider computers 206 may be in communication with the service provider computers 210 and/or the computing devices 204 via the networks 208, or via other network connections. The third-party service provider computers 206 may include one or more servers, perhaps arranged in a cluster, as a server farm, or as individual servers not associated with one another. These servers may be configured to provide information associated with the vehicles 214 (e.g., vehicle data) and/or the users 202 (e.g., credit data). In some aspects, the third-party services may include, but are not limited to, information aggregation services (e.g., services that determine market values for items based on aggregated information associated with those items), financial institutions, credit institutions, and the like. As such, when requested by the service provider computers 210, the third-party service provider computers 206 may provide information associated with the vehicles 214 and/or the users 202.

In one illustrative configuration, the service provider computer 210 may include at least a memory 231 and one or more processing units (or processors) 232. The processors 232 may be implemented as appropriate in hardware, software, firmware, or combinations thereof. Software or firmware implementations of the processors 232 may include computer-executable or machine-executable instructions written in any suitable programming language to perform the various functions described.

The memory 231 may store program instructions that are loadable and executable on the processors 232, as well as data generated during the execution of these programs. Depending on the configuration and type of service provider computer 210, the memory 231 may be volatile (such as random access memory (RAM)) and/or non-volatile (such as read-only memory (ROM), flash memory, etc.). The service provider computer 210 or server may also include additional removable storage 234 and/or non-removable storage 236 including, but not limited to, magnetic storage, optical disks, and/or tape storage. The disk drives and their associated computer-readable media may provide non-volatile storage of computer-readable instructions, data structures, program modules, and other data for the computing devices. In some implementations, the memory 231 may include multiple different types of memory, such as static random access memory (SRAM), dynamic random access memory (DRAM), or ROM.

The memory 231, the removable storage 234, and the non-removable storage 236 are all examples of computer-readable storage media. For example, computer-readable storage media may include volatile and non-volatile, removable and non-removable media implemented in any method or technology for the storage of information such as computer-readable instructions, data structures, program modules, or other data. The memory 231, the removable storage 234, and the non-removable storage 236 are all examples of computer storage media. Additional types of computer storage media that may be present include, but are not limited to, programmable random access memory (PRAM), SRAM, DRAM, RAM, ROM, electrically erasable programmable read-only memory (EEPROM), flash memory or other memory technology, compact disc read-only memory (CD-ROM), digital versatile disc (DVD) or other optical storage, magnetic cassettes, magnetic tape, magnetic disk storage or other magnetic storage devices, or any other medium which can be used to store the desired information and which can be accessed by the service provider computer 210 or other computing devices. Combinations of the any of the above should also be included within the scope of computer-readable media.

Alternatively, computer-readable communication media may include computer-readable instructions, program modules, or other data transmitted within a data signal, such as a carrier wave, or other transmission. However, as used herein, computer-readable storage media does not include computer-readable communication media.

The service provider computer 210 may also contain communication connection(s) 238 that allow the service provider computer 210 to communicate with a stored database, another computing device or server, user terminals, and/or other devices on a network. The service provider computer 210 may also include input device(s) 240 such as a keyboard, a mouse, a pen, a voice input device, a touch input device, etc., and output device(s) 242, such as a display, speakers, printers, etc.

Turning to the contents of the memory 231 in more detail, the memory 231 may include an operating system 244 and one or more application programs or services for implementing the features disclosed herein, including a model module 246, a recommendation module 248, and a feedback module 251. In some instances, the model module 246, the recommendation module 248, and the feedback module 251 may receive, transmit, and/or store information in the database 250.

The model module 246 may generate one or more machine-learned models. The machine-learned models may be include one or more supervised machine-learned models, one or more unsupervised machine-learned models, one or more neural networks (e.g., deep neural networks) or any other multi-layer non-linear models. A neural network may include a recurrent neural network (e.g., a long short-term memory recurrent neural network), a feed-forward neural network, or any other form of a neural network.

The model module 246 may train a machine-learned model by adjusting weights or sub-weights of the machine-learned model to optimize a loss function or a cost function such that an error between an output of the machine-learned model and an expected output is reduced. The model module 246 may train one or more machine-learned models using various training or learning techniques, such as, for example, backwards propagation of errors. In some embodiments, performing backwards propagation of errors may include performing truncated backpropagation through time. The model module 246 may perform a number of generalization techniques (e.g., weight decays, dropouts, etc.) to improve the generalization capability of the one or more machine-learned models being trained.

In particular, the model module 246 may train the one or more machine-learned models based on training sets that may be stored in the database 250. Additionally or alternatively, the training set may be received from the feedback module 251, the computing devices 204 and/or the third-party service provider computers 206.

In some embodiments, the model module 246 may include computer logic utilized to provide desired functionality. The model module 246 can be implemented in hardware, firmware, and/or software controlling a general purpose processor. For example, in some embodiments, the model module 246 may include program files stored on a storage device, loaded into a memory and executed by one or more processors. In some embodiments, the model module 246 may include one or more sets of computer-executable instructions that are stored in a tangible computer-readable storage medium such as RAM hard disk or optical or magnetic media.

In some embodiments, the trained machine-learned model may be included in or otherwise stored in the database 250 and implemented by the service provider computer 210. Additionally or alternatively, the trained machine-learned model may be included in or otherwise stored and implemented by the computing device 204 that communicates with the service provider computer according to a client-server relationship. For example, the service provider computer may send the trained machine-learned model to the computing device 204 over the network 208, stored in a memory of the computing device 204, and the implemented by one or more processors of the computing device 204.

In some embodiments, the model module 246 may refine or re-train a machine-leaned model using a value generated by the same machine-learned model. As one example, the model module 246 may determine that a value generated by a machine-learned model is greater than the profitability threshold, and determine that the product or service has been purchased by the user based on user purchase information received from the feedback module 251. The model module 246 may determine an adjustment to further refine one or more sub-weights indicative of a strong correlation between datasets associated with the one or more sub-weights and the value. The model module 246 may generate an adjusted machine-learned model based on the adjusted sub-weights. As another example, the model module 246 may determine that the value is less than the profitability of the product or service. The model module 246 may further determine that the product or service has been purchased by the user, or vice versa. The model module 246 may determine an adjustment to one or more sub-weights indicative of a strong correlation between datasets associated with the one or more sub-weights and the associated value. The model module 246 may generate an adjusted machine-learned model based on the adjusted sub-weights. Additionally or alternatively, the model module 246 may update sub-weights for all the datasets, and re-select one or more updated sub-weights indicative of strong correlation between datasets associated with the one or more updated sub-weights and an associated value. In some embodiments, the model module 246 may refine or re-train the machine-learned model based on the feedback measurement indicative of user purchases associated with the product or service. As one example, the model module 246 may receive the feedback measurement indicating that the user has purchased the product or service from the feedback module 251. The model module 246 may determine a profit value produced by the product or service. The model module 246 may determine an adjustment to further refine one or more sub-weights indicative of a strong correlation between datasets associated with the one or more sub-weights and the associated value. The model module 246 may generate an adjusted value based on the adjusted sub-weights. The adjusted value may be more consistent with the profit value compared with the previous value. As another example, the model module 246 may update sub-weights for all the datasets, and re-select one or more updated sub-weights indicative of strong correlation between datasets associated with the one or more updated sub-weights and an associated value. The computer system may replace the previous sub-weights indicative of a strong correlation between datasets associated with the sub-weights and the associated value by the adjusted sub-weights. The computer system may determine an adjusted correlation between a dataset associated with the adjusted sub-weights and the adjusted value.

The recommendation module 248 may uses a trained machine-learned model to recommend one or more products or services. The recommendation module 248 may receive a user identifier (e.g., a user identification number, a social security number, driver license number, etc.) from the computing devices 204 via the application interface 230. The recommendation module 248 may retrieve credit data associated with the user identifier and vehicle data associated with a vehicle. For example, the recommendation module 248 may retrieve the credit data and vehicle data from the database 250. In some embodiments, the recommendation module 248 may receive the credit data and/or vehicle data from the third-party service provider computers.

The recommendation module 248 may determine a first weight for the credit data and a second weight for the vehicle data based on the trained machine-learned model. For instance, the credit data and vehicle data may be an input for the trained machine-learned model. The recommendation module 248 may determine respective weights and sub-weights associated with the credit data and vehicle data that are assigned by the trained machine-learned model. The recommendation module 248 may determine, based on the first weight and the second weight, a value indicative of a profitability of a product or service based on the trained machine-learned model. The value may be an output of the machine-learned model.

The recommendation module 248 may determine whether or not the value exceeds a profitability threshold. If the recommendation module 248 determines that the value is greater than the profitability threshold, the recommendation module 248 may send an indication of the product or service to the computing device 204 for presentation. For example, the recommendation module 248 may send instructions to the computing device 204 such that the instructions are executed by one or more processors in the computing device 204 to cause the application interface 230 to display the product or service. As another example, the recommendation module 248 may generate the application interface 230 and send the application interface 230 to the computing device 204 for presentation. In some embodiments, the recommendation module 248 may send an indication of weights, sub-weights, and/or the value to the computing device 204. For example, the recommendation module 248 may compare sub-weights with a sub-weight threshold. If the recommendation module 248 determines that the sub-weight is greater than a sub-weight threshold, the recommendation module 248 may send an indication of the sub-weight and the value to the computing device 204 for presentation.

In such way, the user 202 may be able to better understand the datasets that have strong correlations with an associated value such that the user 202 may make an adjustments to the dataset for later use. For example, the computer system may compare sub-weights with a sub-weight threshold. The sub-weight threshold may describe a threshold for determining whether or not a dataset having strong correlation with the value. If the computer system determines that the sub-weight is greater than a sub-weight threshold, the computer system may send an indication of the sub-weight and the value to a user device for presentation.

In some embodiments, the recommendation module 248 may determine whether or not sub-weights exceed a sub-weight threshold. The recommendation module 248 may determine a correlation between datasets associated with the sub-weights and the value based on the determination. For example, the recommendation module 248 may select one or more sub-weighs that are above the sub-weight threshold. The selected one or more sub-weights indicate that datasets associated the selected one or more sub-weights may have strong correlations with a value generated by the machine-learned model.

In some embodiments, the recommendation module 248 may provide multiple vehicle products or services recommendation using the credit data and the vehicle data. The recommendation module 248 may use the machine-learned model to determine a first value indicative of a profitability for a first product or service (e.g., vehicle protection), and to determine a second value indicative of a profitability for a second product or service (e.g., vehicle accessories). If the first value and the second value are greater than the profitability threshold, the recommendation module 248 may send an indication of the first product or service and the second product or service to the user device for presentation. Additionally or alternatively, the recommendation module 248 may determine that the second value is less than the first value, indicating that the first product or service is more likely to produce higher profit than the second product or service. The recommendation module 248 may further determine that the first product or service has been purchased by the user based on the credit data, or that the first product or service has been expired or suspended based on the vehicle data. The recommendation module 248 may remove the first product or service or replace the first product or service by the second product or service for presentation. If the first value is less than the profitability threshold and the second value is greater than the profitability threshold, the recommendation module 248 may remove or replace the first product or service by the second product or service, and send an indication of the second product or service instead of the first product or service to the computing device 204 for presentation.

In some embodiments, the recommendation module 248 may determine different datasets having strong correlations with associated values for different products or services. For instance, the recommendation module 248 may determine a first group of datasets having strong correlations with the first value, and determine a second group of datasets having strong correlations with the second value. The first group and the second group are different. In some embodiments, if the recommendation module 248 uses the same machine-learned model for different products or services, the recommendation module 248 may use different sub-weight threshold. For example, the recommendation module 248 may determine a first set of sub-weights that are greater than a first sub-weight threshold for the first product or service, and a set group of sub-weights that are greater than a second sub-weight threshold for the second product or service. The first sub-weight threshold is different from the second sub-weight threshold (e.g., the first sub-weight threshold is greater than the second sub-weight threshold, or vice versa), and the first set and the second set are different (e.g., at least one sub-weight in the first set is not included in the second set, or vice versa). In some embodiments, the recommendation module 248 may use different machine-learned models for different products or services.

In some embodiments, the recommendation module 248 may determine loan information associated with the user identifier (e.g., customer identifier) using the machine-learned model. For instance, the machine-learned model may use the credit data and vehicle data as inputs and the machine-learned model may output the loan information. The recommendation module 248 may use the graphical user interface (GUI) to display the loan information on the computing device 204. In some embodiments, the recommendation module 248 may use the machine-learned model to determine loan information for the dealer. The recommendation module 248 may use the graphical user interface (GUI) to display the loan information on the computing device 204. The loan information (e.g., financial information for the proposed vehicle deal) may include loan details such as payment schedule, lender, interest rate, and the like.

The feedback module 251 may receive user purchase information from the computing device 204. For example, the feedback module 251 may perform the feedback measurement indicative of user purchases associated with the product or service based on the user purchase information. The feedback module 251 may the user purchase information in the database 250.

The computing devices 204, the one or more third-party service provider computers 206, and the one or more service provider computers 210 may be configured to communicate via the one or more networks 208, wirelessly or wired. The one or more networks 208 may include, but not limited to, any one of a combination of different types of suitable communications networks such as, for example, broadcasting networks, cable networks, public networks (e.g., the Internet), private networks, wireless networks, cellular networks, or any other suitable private and/or public networks. Further, the one or more networks 208 may have any suitable communication range associated therewith and may include, for example, global networks (e.g., the Internet), metropolitan area networks (MANs), wide area networks (WANs), local area networks (LANs), or personal area networks (PANs). In addition, the one or more networks 208 may include any type of medium over which network traffic may be carried including, but not limited to, coaxial cable, twisted-pair wire, optical fiber, a hybrid fiber coaxial (HFC) medium, microwave terrestrial transceivers, radio frequency communication mediums, white space communication mediums, ultra-high frequency communication mediums, satellite communication mediums, or any combination thereof.

Various instructions, methods, and techniques described herein may be considered in the general context of computer-executable instructions, such as program modules, executed by one or more computers or other devices. Generally, program modules may include routines, programs, objects, components, data structures, etc., for performing particular tasks or implementing particular abstract data types. These program modules and the like may be executed as native code or may be downloaded and executed, such as in a virtual machine or other just-in-time compilation execution environment. Typically, the functionality of the program modules may be combined or distributed as desired in various embodiments. An implementation of these modules and techniques may be stored on some form of computer-readable storage media.

The example architectures and computing devices shown in FIG. 2 are provided by way of example only. Numerous other operating environments, system architectures, and device configurations are possible. Accordingly, embodiments of the present disclosure should not be construed as being limited to any particular operating environment, system architecture, or device configuration.

Figure 3:
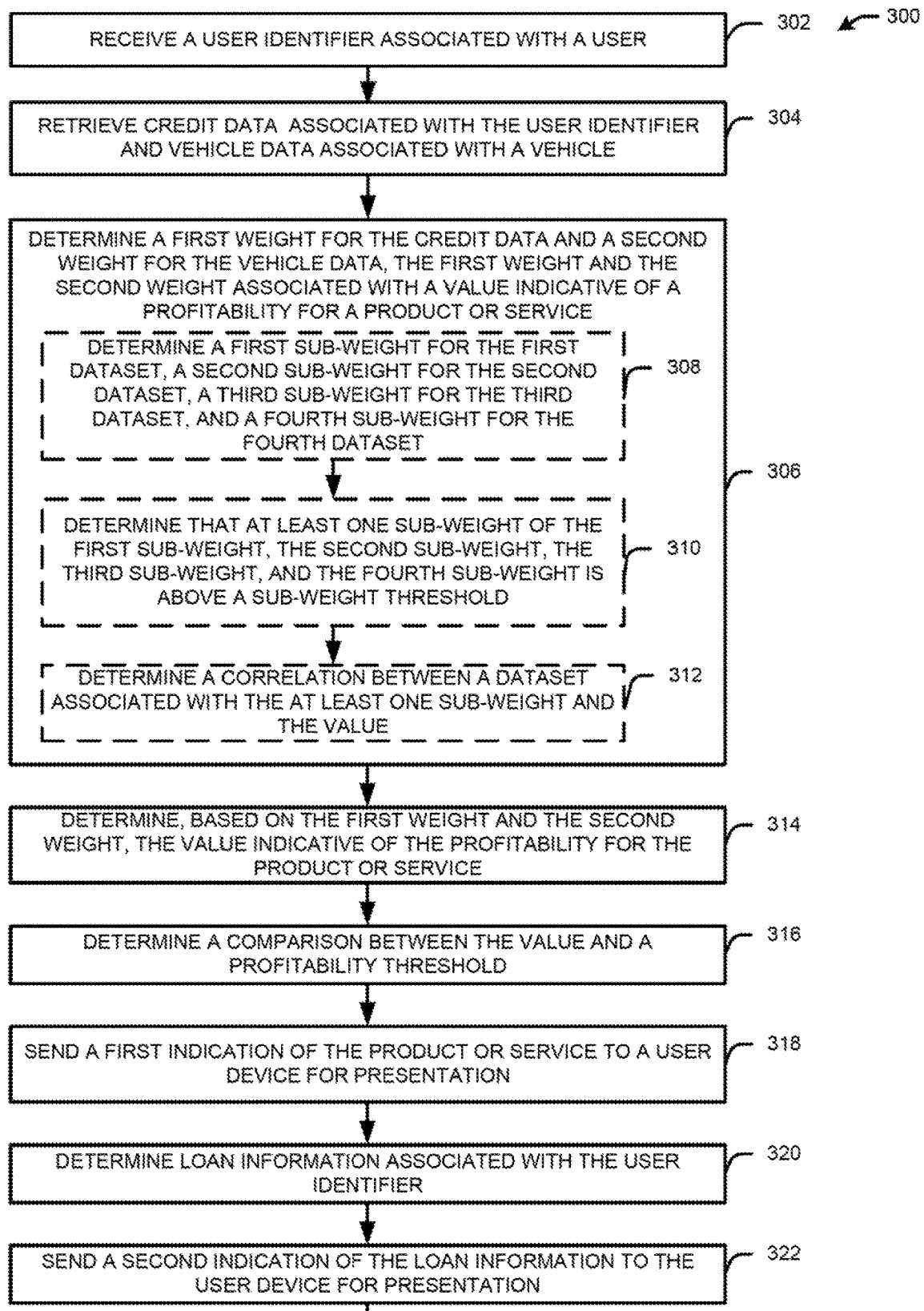
FIG. 3 illustrates an example flow diagram showing a process for vehicle product or service recommendation, in accordance with one or more example embodiments of the present disclosure.

FIG. 3 illustrates an example flow diagram showing a process 300 for vehicle product or service recommendation, in accordance with one or more example embodiments of the present disclosure.

At block 302, a device (e.g., the one or more servers 105 of FIG. 1, the one or more service provider computers 210 of FIG. 2) may receive a user identifier (e.g., a user identification number, a social security number, driver license number, etc.). For example, a non-transitory computer-readable medium storing computer-executable instructions which when executed by one or more processors of the device result in performing operations may include receiving a user identifier.

At block 304, the device may retrieve credit data associated with the user identifier and vehicle data associated with a vehicle. For example, a non-transitory computer-readable medium storing computer-executable instructions which when executed by one or more processors of the device result in performing operations may include retrieving credit data associated with the user identifier and vehicle data associated with a vehicle.

At block 306, the device may determine a first weight for the credit data and a second weight for the vehicle data. In some embodiments, the credit data may include a first dataset and a second dataset, the vehicle data may include a third dataset and a fourth dataset. For example, a non-transitory computer-readable medium storing computer-executable instructions which when executed by one or more processors of the device result in performing operations may include determining a first weight for the credit data and a second weight for the vehicle data.

At block 308, the device may determine a first sub-weight for the first dataset, a second sub-weight for the second dataset, a third sub-weight for the third dataset, and a fourth sub-weight for the fourth dataset. For example, a non-transitory computer-readable medium storing computer-executable instructions which when executed by one or more processors of the device result in performing operations may include determining a first sub-weight for the first dataset, a second sub-weight for the second dataset, a third sub-weight for the third dataset, and a fourth sub-weight for the fourth dataset.

At block 310, the device may determine that at least one sub-weight of the first sub-weight, the second sub-weight, the third sub-weight, and the fourth sub-weight is above a sub-weight threshold. For example, a non-transitory computer-readable medium storing computer-executable instructions which when executed by one or more processors of the device result in performing operations may include determining that at least one sub-weight of the first sub-weight, the second sub-weight, the third sub-weight, and the fourth sub-weight is above a sub-weight threshold.

At block 312, the device may determine a correlation between a dataset associated with the at least one sub-weight and the value. For example, a non-transitory computer-readable medium storing computer-executable instructions which when executed by one or more processors of the device result in performing operations may include determining a correlation between a dataset associated with the at least one sub-weight and the value.

At block 314, the device may determine, based on the first weight and the second weight, the value. For example, a non-transitory computer-readable medium storing computer-executable instructions which when executed by one or more processors of the device result in performing operations may include determining, based on the first weight and the second weight, the value.

At block 316, the device may determine whether or not a value exceeds a profitability threshold. For example, a non-transitory computer-readable medium storing computer-executable instructions which when executed by one or more processors of the device result in performing operations may include determining whether or not the value exceeds a profitability threshold.

At block 318, the device may send a first indication of the product or service to a user device (e.g., the device 102A of FIG. 1, or the computing device 204 of FIG. 2) for presentation. For example, a non-transitory computer-readable medium storing computer-executable instructions which when executed by one or more processors of the device result in performing operations may include sending a first indication of the product or service to a user device for presentation.

At block 320, the device may determine loan information associated with the user identifier. For example, a non-transitory computer-readable medium storing computer-executable instructions which when executed by one or more processors of the device result in performing operations may include determining loan information associated with the user identifier.

Figure 4:
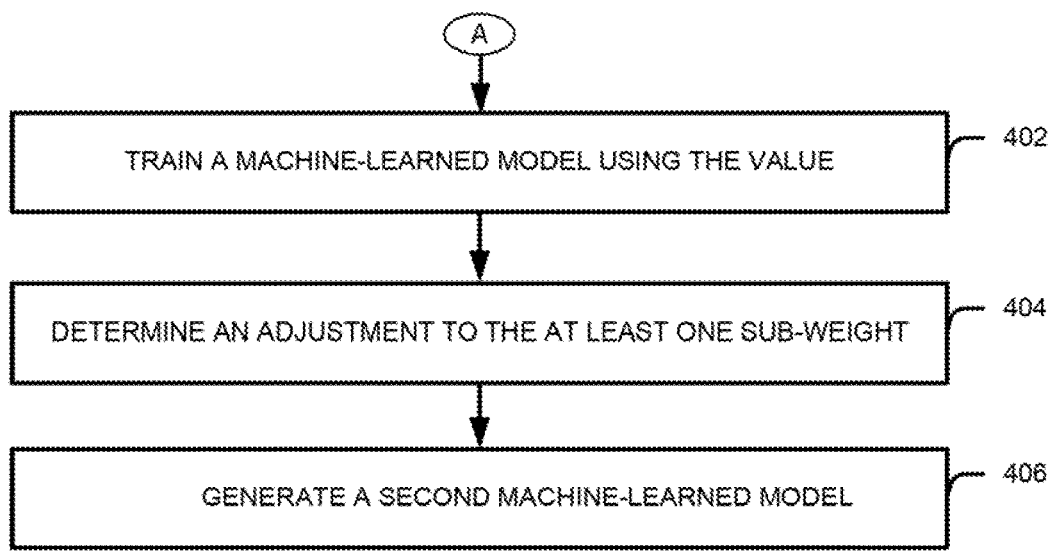
FIG. 4 illustrates an example flow diagram showing a process to generate and apply a machine-learned model for vehicle product or service recommendation, in accordance with one or more example embodiments of the present disclosure.

At block 322, the device may send a second indication of the loan information to the user device (e.g., the device 102A of FIG. 1, or the computing device 204 of FIG. 2) for presentation. For example, a non-transitory computer-readable medium storing computer-executable instructions which when executed by one or more processors of the device result in performing operations may include sending a second indication of the loan information to the user device. FIG. 4 illustrates an example flow diagram showing a process 400 to generate and apply a machine-learned model for vehicle product or service recommendation, in accordance with one or more example embodiments of the present disclosure.

At block 402, the device may train the machine-learn model using the value. For instance, a non-transitory computer-readable medium storing computer-executable instructions which when executed by one or more processors of the device result in performing operations may include training the machine-learn model using the value.

At block 404, the device may determine an adjustment to the at least on sub-weight. For instance, a non-transitory computer-readable medium storing computer-executable instructions which when executed by one or more processors of the device result in performing operations may include determining an adjustment to the at least on sub-weight.

At block 406, the device may generate, based on the adjustment to the at least one sub-weight, a second machine-learned model. For instance, a non-transitory computer-readable medium storing computer-executable instructions which when executed by one or more processors of the device result in performing operations may include generating, based on the adjustment to the at least one sub-weight, a second machine-learned model.

Figure 5:
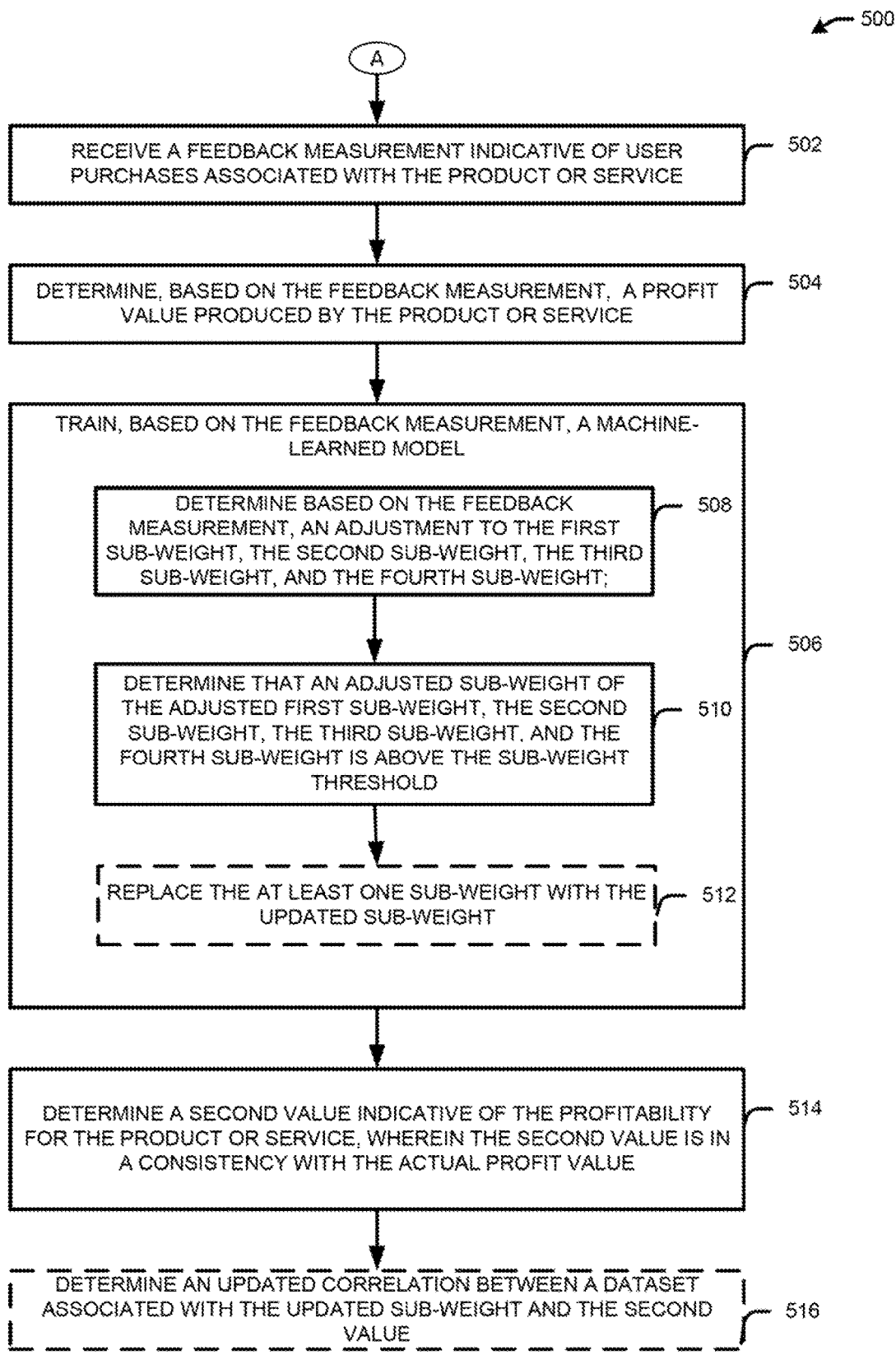
FIG. 5 illustrates an example flow diagram showing a process to train a machine-learned model using feedback measurements for vehicle product or service recommendation, in accordance with one or more example embodiments of the present disclosure.

FIG. 5 illustrates an example flow diagram showing a process 500 to train a machine-learned model using feedback measurements for vehicle product or service recommendation, in accordance with one or more example embodiments of the present disclosure.

At block 502, the device may receive a feedback measurement indicative of user purchases associated with the product or service. For instance, a non-transitory computer-readable medium storing computer-executable instructions which when executed by one or more processors of the device result in performing operations may include receiving a feedback measurement indicative of user purchases associated with the product or service.

At block 504, the device may determine, based on the feedback measurement, a profit value produced by the product or service. For example, a non-transitory computer-readable medium storing computer-executable instructions which when executed by one or more processors of the device result in performing operations may include determining a profit value produced by the product or service. The operations may further include determining one or more users have purchased the product or service based on the feedback measurement.

At block 506, the device may train, based on the feedback measurement, the machine-learned model. For instance, a non-transitory computer-readable medium storing computer-executable instructions which when executed by one or more processors of the device result in performing operations may include training, based on the feedback measurement, the machine-learned model.

At block 508, the device may determine, based on the feedback measurement, an adjustment to the first sub-weight, the second sub-weight, the third sub-weight, and the fourth sub-weight. For instance, a non-transitory computer-readable medium storing computer-executable instructions which when executed by one or more processors of the device result in performing operations may include determining, based on the feedback measurement, an adjustment to the first sub-weight, the second sub-weight, the third sub-weight, and the fourth sub-weight.

At block 510, the device may determine that an adjusted sub-weight of the adjusted first sub-weight, the second sub-weight, the third sub-weight, and the fourth sub-weight is above the sub-weight threshold. For instance, a non-transitory computer-readable medium storing computer-executable instructions which when executed by one or more processors of the device result in performing operations may include determining that an adjusted sub-weight of the adjusted first sub-weight, the second sub-weight, the third sub-weight, and the fourth sub-weight is above the sub-weight threshold.

At block 512, the device may replace the at least one sub-weight with the adjusted sub-weight. For example, a non-transitory computer-readable medium storing computer-executable instructions which when executed by one or more processors of the device result in performing operations may include replacing the at least one sub-weight with the adjusted sub-weight. The operations may further include determining that the adjusted sub-weight and the at least one sub-weight are associated with different datasets.

At block 514, the device may determine, based on the adjustment to the at least one sub-weight, a second value indicative of the profitability for the product or service, wherein the second value is consistent with the profit value. For example, a non-transitory computer-readable medium storing computer-executable instructions which when executed by one or more processors of the device result in performing operations may include determining, based on the adjustment to the at least one sub-weight, a second value indicative of the profitability for the product or service.

At block 516, the device may determine an updated correlation between a dataset associated with the adjusted sub-weight and the second value. For example, a non-transitory computer-readable medium storing computer-executable instructions which when executed by one or more processors of the device result in performing operations may include determining an updated correlation between a dataset associated with the adjusted sub-weight and the second value. The operations may further include determining that the adjusted sub-weight and the at least one sub-weight are associated with different datasets.

Figure 6:
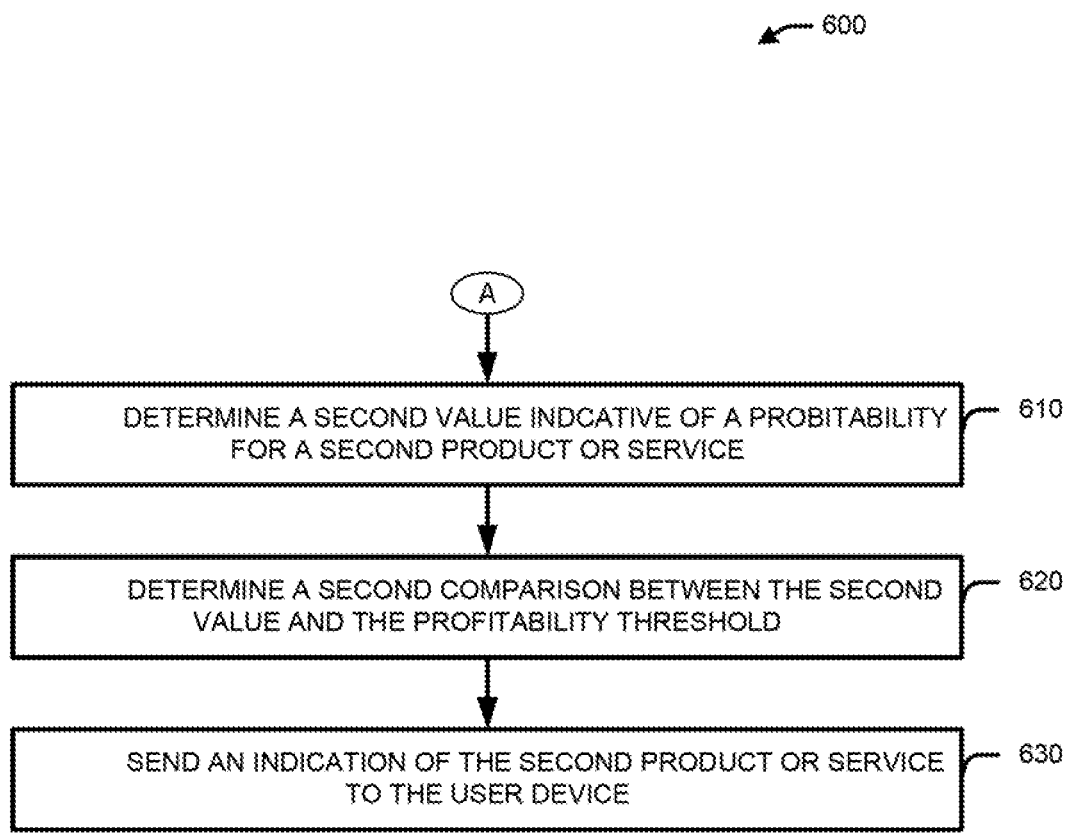
FIG. 6 illustrates an example flow diagram showing a process for multiple vehicle products or services recommendations, in accordance with one or more example embodiments of the present disclosure.

FIG. 6 illustrates an example flow diagram showing a process 600 for multiple vehicle products or services recommendations, in accordance with one or more example embodiments of the present disclosure.

At block 610, the device may determine, based on the first weight and the second weight, a second value indicative of a profitability for a second product or service. For example, a non-transitory computer-readable medium storing computer-executable instructions which when executed by one or more processors of the device result in performing operations may include determining, based on the first weight and the second weight, a second value indicative of a profitability for a second product or service.

At block 620, the device may determine whether or not the second value exceeds the profitability threshold. For example, a non-transitory computer-readable medium storing computer-executable instructions which when executed by one or more processors of the device result in performing operations may include determining whether or not the second value exceeds the profitability threshold.

At block 630, the device may send an indication of the second product or service to the user device. For example, a non-transitory computer-readable medium storing computer-executable instructions which when executed by one or more processors of the device result in performing operations may include sending an indication of the second product or service to the user device.

Figure 7:
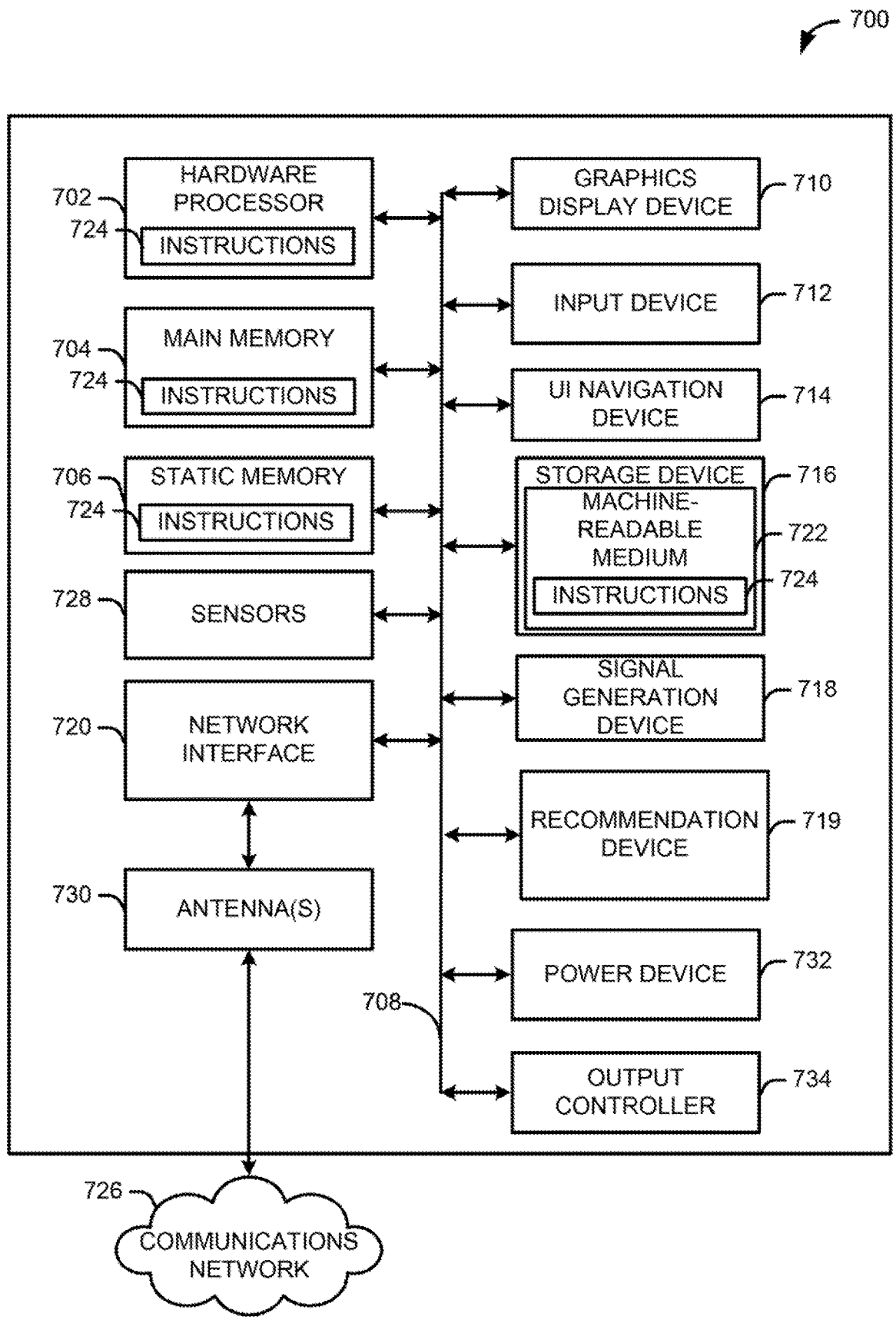
FIG. 7 illustrates a block diagram of an example of a machine, in accordance with one or more example embodiments of the present disclosure.

FIG. 7 illustrates a block diagram of an example of a machine 700 (e.g., the one or more servers 105 of FIG. 1, the one or more service provider computers 210 of FIG. 2) or system upon which any one or more of the techniques (e.g., methodologies) discussed herein may be performed. In other embodiments, the machine 700 may operate as a standalone device or may be connected (e.g., networked) to other machines. In a networked deployment, the machine 700 may operate in the capacity of a server machine, a client machine, or both in server-client network environments. In an example, the machine 700 may act as a peer machine in Wi-Fi direct, peer-to-peer (P2P) (or other distributed) network environments. The machine 700 may be a server, a personal computer (PC), a tablet PC, a set-top box (STB), a personal digital assistant (PDA), a mobile telephone, a wearable computer device, a web appliance, a network router, a switch or bridge, or any machine capable of executing instructions (sequential or otherwise) that specify actions to be taken by that machine, such as a base station. Further, while only a single machine is illustrated, the term "machine" shall also be taken to include any collection of machines that individually or jointly execute a set (or multiple sets) of instructions to perform any one or more of the methodologies discussed herein, such as cloud computing, software as a service (SaaS), or other computer cluster configurations.

Examples, as described herein, may include or may operate on logic or a number of components, modules, or mechanisms. Modules are tangible entities (e.g., hardware) capable of performing specified operations when operating. A module includes hardware. In an example, the hardware may be specifically configured to carry out a specific operation (e.g., hardwired). In another example, the hardware may include configurable execution units (e.g., transistors, circuits, etc.) and a computer readable medium containing instructions where the instructions configure the execution units to carry out a specific operation when in operation. The configuring may occur under the direction of the executions units or a loading mechanism. Accordingly, the execution units are communicatively coupled to the computer-readable medium when the device is operating. In this example, the execution units may be a member of more than one module. For example, under operation, the execution units may be configured by a first set of instructions to implement a first module at one point in time and reconfigured by a second set of instructions to implement a second module at a second point in time.

The machine (e.g., computer system) 700 may include a hardware processor 702 (e.g., a central processing unit (CPU), a graphics processing unit (GPU), a hardware processor core, or any combination thereof), a main memory 704 and a static memory 706, some or all of which may communicate with each other via an interlink (e.g., bus) 708. The machine 700 may further include a power management device 732, a graphics display device 710, an alphanumeric input device 712 (e.g., a keyboard), and a user interface (UI) navigation device 714 (e.g., a mouse). In an example, the graphics display device 710, alphanumeric input device 712, and UI navigation device 714 may be a touch screen display. The machine 700 may additionally include a storage device (i.e., drive unit) 716, a signal generation device 718 (e.g., an emitter, a speaker), a recommendation device 719, a network interface device/transceiver 720 coupled to antenna(s) 730, and one or more sensors 728, such as a global positioning system (GPS) sensor, a compass, an accelerometer, or other sensor. The machine 700 may include an output controller 734, such as a serial (e.g., universal serial bus (USB), parallel, or other wired or wireless (e.g., infrared (IR), near field communication (NFC), etc.) connection to communicate with or control one or more peripheral devices (e.g., a printer, a card reader, etc.)).

The storage device 716 may include a machine readable medium 722 on which is stored one or more sets of data structures or instructions 724 (e.g., software) embodying or utilized by any one or more of the techniques or functions described herein. The instructions 724 may also reside, completely or at least partially, within the main memory 704, within the static memory 706, or within the hardware processor 702 during execution thereof by the machine 700. In an example, one or any combination of the hardware processor 702, the main memory 704, the static memory 706, or the storage device 716 may constitute machine-readable media.

The recommendation device 719 may carry out or perform any of the operations and processes (e.g., process 300 of FIG. 3, process 400 of FIG. 4, process 500 of FIG. 5, and process 600 of FIG. 6) described above. The recommendation device 719 may be included in a server 104 of FIG. 1 or a service provider computer 210 of FIG. 2. For example, the recommendation device may include or otherwise be in communication with at least the model module 246, the recommendation module 248, and the feedback module 251.

While the machine-readable medium 722 is illustrated as a single medium, the term "machine-readable medium" may include a single medium or multiple media (e.g., a centralized or distributed database, and/or associated caches and servers) configured to store the one or more instructions 724.

Various embodiments may be implemented fully or partially in software and/or firmware. This software and/or firmware may take the form of instructions contained in or on a non-transitory computer-readable storage medium. Those instructions may then be read and executed by one or more processors to enable performance of the operations described herein. The instructions may be in any suitable form, such as but not limited to source code, compiled code, interpreted code, executable code, static code, dynamic code, and the like. Such a computer-readable medium may include any tangible non-transitory medium for storing information in a form readable by one or more computers, such as but not limited to read only memory (ROM); random access memory (RAM); magnetic disk storage media; optical storage media; a flash memory, etc.

The term "machine-readable medium" may include any medium that is capable of storing, encoding, or carrying instructions for execution by the machine 700 and that cause the machine 700 to perform any one or more of the techniques of the present disclosure, or that is capable of storing, encoding, or carrying data structures used by or associated with such instructions. Non-limiting machine-readable medium examples may include solid-state memories and optical and magnetic media. In an example, a massed machine-readable medium includes a machine-readable medium with a plurality of particles having resting mass. Specific examples of massed machine-readable media may include non-volatile memory, such as semiconductor memory devices (e.g., electrically programmable read-only memory (EPROM), or electrically erasable programmable read-only memory (EEPROM)) and flash memory devices; magnetic disks, such as internal hard disks and removable disks; magneto-optical disks; and CD-ROM and DVD-ROM disks.

The instructions 724 may further be transmitted or received over a communications network 726 using a transmission medium via the network interface device/transceiver 720 utilizing any one of a number of transfer protocols (e.g., frame relay, internet protocol (IP), transmission control protocol (TCP), user datagram protocol (UDP), hypertext transfer protocol (HTTP), etc.). Example communications networks may include a local area network (LAN), a wide area network (WAN), a packet data network (e.g., the Internet), mobile telephone networks (e.g., cellular networks), plain old telephone (POTS) networks, wireless data networks (e.g., Institute of Electrical and Electronics Engineers (IEEE) 802.11 family of standards known as Wi-Fi®, IEEE 802.16 family of standards known as WiMax®), IEEE 802.15.4 family of standards, and peer-to-peer (P2P) networks, among others. In an example, the network interface device/transceiver 720 may include one or more physical jacks (e.g., Ethernet, coaxial, or phone jacks) or one or more antennas to connect to the communications network 726. In an example, the network interface device/transceiver 720 may include a plurality of antennas to wirelessly communicate using at least one of single-input multiple-output (SIMO), multiple-input multiple-output (MIMO), or multiple-input single-output (MISO) techniques. The term "transmission medium" shall be taken to include any intangible medium that is capable of storing, encoding, or carrying instructions for execution by the machine 700 and includes digital or analog communications signals or other intangible media to facilitate communication of such software.

The operations and processes described and shown above may be carried out or performed in any suitable order as desired in various implementations. Additionally, in certain implementations, at least a portion of the operations may be carried out in parallel. Furthermore, in certain implementations, less than or more than the operations described may be performed.

The word "exemplary" is used herein to mean "serving as an example, instance, or illustration." Any embodiment described herein as "exemplary" is not necessarily to be construed as preferred or advantageous over other embodiments. The terms "computing device," "user device," "communication station," "station," "handheld device," "mobile device," "wireless device" and "user equipment" (UE) as used herein refers to a wireless communication device such as a cellular telephone, a smartphone, a tablet, a netbook, a wireless terminal, a laptop computer, a femtocell, a high data rate (HDR) subscriber station, an access point, a printer, a point of sale device, an access terminal, or other personal communication system (PCS) device. The device may be either mobile or stationary.

As used within this document, the term "communicate" is intended to include transmitting, or receiving, or both transmitting and receiving. This may be particularly useful in claims when describing the organization of data that is being transmitted by one device and received by another, but only the functionality of one of those devices is required to infringe the claim. Similarly, the bidirectional exchange of data between two devices (both devices transmit and receive during the exchange) may be described as "communicating," when only the functionality of one of those devices is being claimed. The term "communicating" as used herein with respect to a wireless communication signal includes transmitting the wireless communication signal and/or receiving the wireless communication signal. For example, a wireless communication unit, which is capable of communicating a wireless communication signal, may include a wireless transmitter to transmit the wireless communication signal to at least one other wireless communication unit, and/or a wireless communication receiver to receive the wireless communication signal from at least one other wireless communication unit.

As used herein, unless otherwise specified, the use of the ordinal adjectives "first," "second," "third," etc., to describe a common object, merely indicates that different instances of like objects are being referred to and are not intended to imply that the objects so described must be in a given sequence, either temporally, spatially, in ranking, or in any other manner.

Some embodiments may be used in conjunction with various devices and systems, for example, a personal computer (PC), a desktop computer, a mobile computer, a laptop computer, a notebook computer, a tablet computer, a server computer, a handheld computer, a handheld device, a personal digital assistant (PDA) device, a handheld PDA device, an on-board device, an off-board device, a hybrid device, a vehicular device, a non-vehicular device, a mobile or portable device, a consumer device, a non-mobile or non-portable device, a wireless communication station, a wireless communication device, a wireless access point (AP), a wired or wireless router, a wired or wireless modem, a video device, an audio device, an audio-video (A/V) device, a wired or wireless network, a wireless area network, a wireless video area network (WVAN), a local area network (LAN), a wireless LAN (WLAN), a personal area network (PAN), a wireless PAN (WPAN), and the like.

Some embodiments may be used in conjunction with one way and/or two-way radio communication systems, cellular radio-telephone communication systems, a mobile phone, a cellular telephone, a wireless telephone, a personal communication system (PCS) device, a PDA device which incorporates a wireless communication device, a mobile or portable global positioning system (GPS) device, a device which incorporates a GPS receiver or transceiver or chip, a device which incorporates an RFID element or chip, a multiple input multiple output (MIMO) transceiver or device, a single input multiple output (SIMO) transceiver or device, a multiple input single output (MISO) transceiver or device, a device having one or more internal antennas and/or external antennas, digital video broadcast (DVB) devices or systems, multi-standard radio devices or systems, a wired or wireless handheld device, e.g., a smartphone, a wireless application protocol (WAP) device, or the like.

Some embodiments may be used in conjunction with one or more types of wireless communication signals and/or systems following one or more wireless communication protocols, for example, radio frequency (RF), infrared (IR), frequency-division multiplexing (FDM), orthogonal FDM (OFDM), time-division multiplexing (TDM), time-division multiple access (TDMA), extended TDMA (E-TDMA), general packet radio service (GPRS), extended GPRS, code-division multiple access (CDMA), wideband CDMA (WCDMA), CDMA 2000, single-carrier CDMA, multi-carrier CDMA, multi-carrier modulation (MDM), discrete multi-tone (DMT), Bluetooth®, global positioning system (GPS), Wi-Fi, Wi-Max, ZigBee, ultra-wideband (UWB), global system for mobile communications (GSM), 2G, 2.5G, 3G, 3.5G, 4G, fifth generation (5G) mobile networks, 3GPP, long term evolution (LTE), LTE advanced, enhanced data rates for GSM Evolution (EDGE), or the like. Other embodiments may be used in various other devices, systems, and/or networks.

It is understood that the above descriptions are for purposes of illustration and are not meant to be limiting.

Although specific embodiments of the disclosure have been described, numerous other modifications and alternative embodiments are within the scope of the disclosure. For example, any of the functionality described with respect to a particular device or component may be performed by another device or component. Further, while specific device characteristics have been described, embodiments of the disclosure may relate to numerous other device characteristics. Further, although embodiments have been described in language specific to structural features and/or methodological acts, it is to be understood that the disclosure is not necessarily limited to the specific features or acts described. Rather, the specific features and acts are disclosed as illustrative forms of implementing the embodiments. Conditional language, such as, among others, "can," "could," "might," or "may," unless specifically stated otherwise, or otherwise understood within the context as used, is generally intended to convey that certain embodiments could include, while other embodiments may not include, certain features, elements, and/or steps. Thus, such conditional language is not generally intended to imply that features, elements, and/or steps are in any way required for one or more embodiments.

That which is claimed:

1. A method comprising:
   receiving, by a device comprising at least one processor, a customer identifier;
   retrieving, by the device, credit data associated with the customer identifier and vehicle data associated with a vehicle;
   determining, by the device, a first weight for the credit data and a second weight for the vehicle data;
   determining, by the device, based on the first weight and the second weight, a first profit value indicative of a first profitability for a product or service, wherein the credit data comprises a first dataset and a second dataset, and the vehicle data comprises a third dataset and a fourth dataset;
   determining, by the device, a first sub-weight for the first dataset, a second sub-weight for the second dataset, a third sub-weight for the third dataset, and a fourth sub-weight for the fourth dataset;
   receiving, by the device, a feedback measurement indicative of user purchases associated with the product or service;
   determining, by the device, based on the feedback measurement, a second profit value indicative of a first profitability for the product or service;
   determining, by the device, an adjustment to at least one sub-weight of the first sub-weight, the second sub-weight, the third sub-weight, and the fourth sub-weight that is above a sub-weight threshold; and
   determining, by the device, based on the adjustment to the at least one sub-weight, a third profit value indicative of a third profitability for the product or service, wherein the third profit value is closer to the second profit value than the first profit value is to the second profit value;
   determining, by the device, a loan information associated with the customer identifier;
   sending, by the device, a first indication of the product or service to a second device for presentation; and
   sending, by the device, a second indication of the loan information to the second device for presentation.

2. The method of claim 1, wherein determining the first weight for the credit data and the second weight for the vehicle data comprises:
   determining, by the device, a correlation between a dataset associated with the at least one sub-weight and the first profit value.

3. The method of claim 2, wherein determining the first profit value is based on a first machine-learned model, the method further comprises:
   training, by the device, the first machine-learned model using the first profit value;
   determining, by the device, an adjustment to the at least one sub-weight; and
   generating, by the device and based on the adjustment to the at least one sub-weight, a second machine-learned model.

4. The method of claim 1, wherein determining the adjustment to the at least one sub-weight further comprises:
   replacing, by the device, the at least one sub-weight with the adjusted sub-weight; and
   determining, by the device, an adjusted correlation between a dataset associated with the adjusted sub-weight and the second profit value.

5. The method of claim 1, further comprising:
   determining, by the device, based on the first weight and the second weight, a fourth profit value, the fourth profit value indicative of a profitability for a second product or service; and
   comparing, by the device, the fourth profit value to a profitability threshold.

6. The method of claim 5, further comprising:
   determining, by the device, that the first profit value is less than the profitability threshold and the fourth profit value is greater than the profitability threshold; and
   replacing, by the device, the first indication of the product or service by a third indication of the second product or service.

7. The method of claim 5, further comprising:
   determining, by the device, that the first profit value and the fourth profit value are greater than the profitability threshold;
   determining, by the device, that the fourth profit value is less than the first profit value; and
   replacing, by the device, the first indication of the product or service by a third indication of the second product or service.

8. A non-transitory computer-readable medium storing computer-executable instructions which when executed by one or more processors of a device result in performing operations comprising:
   receiving a customer identifier associated;
   receiving credit data associated with the customer identifier and vehicle data associated with a vehicle;
   determining a first weight for the credit data and a second weight for the vehicle data, the first weight and the second weight associated with a first profit value indicative of a first profitability for a product or service, wherein the credit data comprises a first dataset and a second dataset, and the vehicle data comprises a third dataset and a fourth dataset;
   determining, based on the first weight and the second weight, the first profit value;

determining a first sub-weight for the first dataset, a second sub-weight for the second dataset, a third sub-weight for the third dataset, and a fourth sub-weight for the fourth dataset;

receiving a feedback measurement indicative of user purchases associated with the product or service;

determining, based on the feedback measurement, a second profit value indicative of a first profitability for the product or service;

determining an adjustment to at least one sub-weight of the first sub-weight, the second sub-weight, the third sub-weight, and the fourth sub-weight is above a sub-weight threshold; and determining, based on the adjustment to the at least one sub-weight, a third profit value indicative of a third profitability for the product or service, wherein the third profit value is closer to the second profit value than the first profit value is to the second profit value;

determining a loan information associated with the customer identifier;

sending a first indication of the product or service to a user device for presentation; and sending a second indication of the loan information to the user device for presentation.

9. The non-transitory computer-readable medium of claim 8, wherein determining the first weight for the credit data and the second weight for the vehicle data comprises:

determining a correlation between a dataset associated with the at least one sub-weight and the first profit value.

10. The non-transitory computer-readable medium of claim 9, wherein determining the first profit value indicative of the first profitability for the product or service is based on a first machine-learned model, and wherein the operations further comprise:

training the first machine-learned model using the first profit value;

determining an adjustment to the at least one sub-weight; and generating, based on the adjustment to at least one sub-weight, a second machine-learned model.

11. The non-transitory computer-readable medium of claim 8, wherein determining the adjustment to the at least one sub-weight comprises:

replacing the at least one sub-weight with the adjusted sub-weight; and determining an adjusted correlation between a dataset associated with the adjusted sub-weight and the second profit value.

12. The non-transitory computer-readable medium of claim 8, wherein the operations further comprise:

determining, based on the first weight and the second weight, a fourth profit value indicative of a profitability for a second product or service;

comparing the fourth profit value and a profitability threshold; and sending an indication of the second product or service to the user device.

13. A system comprising memory coupled to at least one processor, the at least one processor configured to:

receive a customer identifier;

receive credit data associated with the customer identifier and vehicle data associated with a vehicle;

determine a first weight for the credit data and a second weight for the vehicle data, the first weight and the second weight associated with a first profit value indicative of a first profitability for a product or service, wherein the credit data comprises a first dataset and a second dataset, and the vehicle data comprises a third dataset and a fourth dataset;

determine, based on the first weight and the second weight, the first profit value;

determine a first sub-weight for the first dataset, a second sub-weight for the second dataset, a third sub-weight for the third dataset, and a fourth sub-weight for the fourth dataset;

receive a feedback measurement indicative of user purchases associated with the product or service;

determine, based on the feedback measurement, a second profit value indicative of a first profitability for the product or service;

determine an adjustment to at least one sub-weight of the first sub-weight, the second sub-weight, the third sub-weight, and the fourth sub-weight is above a sub-weight threshold; and determine, based on the adjustment to the at least one sub-weight, a third profit value indicative of a third profitability for the product or service, wherein the third profit value is closer to the second profit value than the first profit value is to the second profit value;

determine a loan information associated with the customer identifier;

send a first indication of the product or service to a user device for presentation; and send a second indication of the loan information to the user device for presentation.

14. The system of claim 13, wherein determining the first weight for the credit data and the second weight for the vehicle data comprises:

determining a correlation between a dataset associated with the at least one sub-weight and the first profit value.

15. The system of claim 14, wherein determining the first profit value indicative of the first profitability for the product or service is based on a first machine-learned model, wherein the at least one processor is further configured to:

train the first machine-learned model using the first profit value;

determine an adjustment to the at least on sub-weight; and generate, based on the adjusted one sub-weight, a second machine-learned model.

16. The system of claim 13, wherein determining the adjustment to the at least one sub-weight further comprises:

replacing the at least one sub-weight with the adjusted sub-weight; and determining an adjusted correlation between a dataset associated with the adjusted sub-weight and the second profit value.

17. The system of claim 13, wherein the at least one processor is further configured to:

determine, based on the first weight and the second weight, a fourth profit value indicative of a profitability for a second product or service;

compare the fourth profit value and a profitability threshold; and send an indication of the second product or service to the user device.

18. The method of claim 3, wherein the first machine-learned model comprises a neural network.

19. The non-transitory computer-readable medium of claim 10, wherein the first machine-learned model comprises a neural network.

20. The system of claim 15, wherein the first machine-learned model comprises a neural network.

* * * * *

UNITED STATES PATENT AND TRADEMARK OFFICE
CERTIFICATE OF CORRECTION

PATENT NO. : 11,170,431 B2
APPLICATION NO. : 16/752059
DATED : November 9, 2021
INVENTOR(S) : Vishal Gaur, Mazen Letayf and Rahul Gupta It is certified that error appears in the above-identified patent and that said Letters Patent is hereby corrected as shown below:

On the Title Page

Item (72) Inventors, please delete "Vishal Gaur, North Hills, NY (US); Mazen Letayf, North Hills, NY (US)" and replace with "Vishal Gaur, North Hills, NY (US); Mazen Letayf, North Hills, NY (US); Rahul Gupta, Atlanta, GA (US)"

Signed and Sealed this
Twenty-first Day of March, 2023

*Katherine Kelly Vidal*

Katherine Kelly Vidal
*Director of the United States Patent and Trademark Office*